United States Patent
Darcy (10) Patent No.: US 10,963,431 B2
(45) Date of Patent: Mar. 30, 2021

(54) STORING AN OBJECT IN A DISTRIBUTED STORAGE SYSTEM

(71) Applicant: Red Hat, Inc., Raleigh, NC (US)

(72) Inventor: Jeffrey Darcy, Lexington, MA (US)

(73) Assignee: RED HAT, INC., Raleigh, NC (US)

(*) Notice: Subject to any disclaimer, the term of this patent is extended or adjusted under 35 U.S.C. 154(b) by 186 days.

(21) Appl. No.: 13/915,469

(22) Filed: Jun. 11, 2013

(65) Prior Publication Data

US 2014/0365541 A1 Dec. 11, 2014

(51) Int. Cl.
*G06F 12/00* (2006.01)
*G06F 17/30* (2006.01)
*G06F 16/182* (2019.01)

(52) U.S. Cl.
CPC .................... *G06F 16/182* (2019.01)

(58) Field of Classification Search
CPC ......... G06F 17/30914; G06F 17/30203; G06F 17/30115; G06F 17/30091; H04L 67/1097
See application file for complete search history.

(56) References Cited

U.S. PATENT DOCUMENTS

| | | | | |
|---|---|---|---|---|
| 5,905,990 | A * | 5/1999 | Inglett | G06F 16/10 |
| 6,480,865 | B1 * | 11/2002 | Lee | G06F 17/2247 |
| | | | | 707/E17.118 |
| 6,529,909 | B1 * | 3/2003 | Bowman-Amuah | G06F 17/30569 |
| 7,165,240 | B2 * | 1/2007 | Patterson | G06F 11/368 |
| | | | | 717/116 |
| 7,546,313 | B1 * | 6/2009 | Sonderegger | H04L 41/0266 |
| 7,571,092 | B1 * | 8/2009 | Nieh | G06F 9/4448 |
| | | | | 704/1 |
| 7,574,652 | B2 * | 8/2009 | Lennon et al. | 715/248 |
| 7,636,656 | B1 * | 12/2009 | Nieh | G06F 17/289 |
| | | | | 704/1 |
| 7,721,280 | B1 * | 5/2010 | Frisbie | H04L 67/06 |
| | | | | 717/172 |
| 7,814,077 | B2 | 10/2010 | Nguyen et al. | |
| 7,860,964 | B2 * | 12/2010 | Brady | H04L 61/1511 |
| | | | | 709/219 |
| 8,396,969 | B1 * | 3/2013 | Schwartz | H04L 29/00 |
| | | | | 707/999.003 |
| 2003/0028517 | A1 * | 2/2003 | Nakano | G06F 16/958 |

(Continued)

FOREIGN PATENT DOCUMENTS

JP 2002215505 A 8/2002

*Primary Examiner* — Syed H Hasan
*Assistant Examiner* — Nicholas E Allen
(74) *Attorney, Agent, or Firm* — Haynes and Boone, LLP (57) ABSTRACT

A method and system for storing an object in a distributed storage system are provided. An example system includes an object name identifier that receives a request to save an object having an initial object name within a file system space and determines, based on a set of regular expressions, whether the initial object name is a temporary object name. The example system also includes a converter that, when the initial object name is determined to be a temporary object name, transforms, based on the set of regular expressions, the initial object name into a permanent object name. The example system further includes a selector that applies a function to the permanent object name and selects, based on a result of the function applied to the permanent object name, a server of a plurality of servers. The object is sent to the selected server for storage.

20 Claims, 6 Drawing Sheets

(56) References Cited

U.S. PATENT DOCUMENTS

| | | | |
|---|---|---|---|
| 2003/0153302 A1* | 8/2003 | Lewis et al. | 455/412 |
| 2006/0265508 A1* | 11/2006 | Angel | H04L 29/12047 709/230 |
| 2007/0156842 A1* | 7/2007 | Vermeulen et al. | 709/217 |
| 2008/0276771 A1* | 11/2008 | Ghosh | B23Q 11/1053 82/1.11 |
| 2009/0024674 A1 | 1/2009 | Gallagher | |
| 2009/0083238 A1* | 3/2009 | Chaudhuri | G06F 16/24561 |
| 2009/0150460 A1 | 6/2009 | Mcclanahan et al. | |
| 2009/0164636 A1* | 6/2009 | Tanimoto | 709/226 |
| 2009/0187654 A1* | 7/2009 | Raja et al. | 709/224 |
| 2009/0193498 A1* | 7/2009 | Agarwal | H04L 29/08846 726/1 |
| 2009/0228509 A1* | 9/2009 | McCarthy et al. | 707/102 |
| 2009/0248757 A1 | 10/2009 | Havewala et al. | |
| 2009/0271412 A1* | 10/2009 | Lacapra | G06F 17/30206 |
| 2010/0162126 A1* | 6/2010 | Donaldson et al. | 715/738 |
| 2010/0332401 A1* | 12/2010 | Prahlad et al. | 705/80 |
| 2011/0022812 A1* | 1/2011 | van der Linden et al. | 711/163 |
| 2011/0126169 A1* | 5/2011 | Moore | G06F 8/71 717/106 |
| 2011/0145499 A1 | 6/2011 | Ananthanarayanan et al. | |
| 2011/0246460 A1* | 10/2011 | Hsieh et al. | 707/736 |
| 2012/0005184 A1* | 1/2012 | Thilagar | G06F 17/30979 707/706 |
| 2012/0079175 A1* | 3/2012 | Flynn | G11C 7/1012 711/103 |
| 2012/0089700 A1* | 4/2012 | Safruti | H04L 67/2842 709/217 |
| 2012/0158729 A1* | 6/2012 | Mital et al. | 707/738 |
| 2012/0198069 A1* | 8/2012 | Black et al. | 709/226 |
| 2012/0210068 A1* | 8/2012 | Joshi | G06F 9/45558 711/122 |
| 2012/0221571 A1* | 8/2012 | Orman | G06F 17/3097 707/737 |
| 2012/0233490 A1* | 9/2012 | Barton | H04L 67/1095 713/503 |
| 2012/0233522 A1* | 9/2012 | Barton | G06F 16/2219 714/758 |
| 2012/0296872 A1 | 11/2012 | Frost et al. | |
| 2012/0310648 A1* | 12/2012 | Shimizu | G06F 40/211 704/257 |
| 2012/0311076 A1* | 12/2012 | Rampulla | H04L 61/301 709/217 |
| 2012/0330887 A1* | 12/2012 | Young et al. | 707/610 |
| 2013/0036091 A1* | 2/2013 | Provenzano et al. | 707/624 |
| 2013/0041872 A1* | 2/2013 | Aizman | G06F 17/30194 707/690 |
| 2013/0110778 A1* | 5/2013 | Taylor et al. | 707/624 |
| 2013/0117240 A1* | 5/2013 | Taylor et al. | 707/690 |

* cited by examiner

STORING AN OBJECT IN A DISTRIBUTED STORAGE SYSTEM

FIELD OF THE ART

The present disclosure generally relates to storing an object, and more particularly to storing an object in a distributed storage system.

BACKGROUND

In a distributed storage system, a file may be stored at any one of several candidate locations. For example, the distributed storage system may include a plurality of servers, and the file may be stored at any one of the plurality of servers. One way to determine where to store the file is by using a server directory. The server directory may include a one-to-one mapping of where to store each object, resulting in a lot of data to be maintained. Further, the server directory is a single point of failure. As such, using the server directory may compromise access to objects stored in the distributed storage system.

A distributed storage system may feature a decentralized architecture, meaning that a single point of failure does not exist. In some decentralized distributed storage systems, the computing device storing the object may select a server in the decentralized distributed storage system to store the object and send the object to the selected server for storage.

BRIEF SUMMARY

This disclosure relates to storing an object in a distributed storage system. Methods, systems, and techniques for storing an object in a decentralized distributed storage system are provided.

According to an embodiment, a system for storing an object in a distributed storage system includes an object name identifier that receives a request to save an object having an initial object name within a file system space and determines, based on a set of regular expressions, whether the initial object name is a temporary object name. The system also includes an object name converter that, when the initial object name is determined to be a temporary object name, transforms, based on the set of regular expressions, the initial object name into a permanent object name. The system further includes a storage selector that applies a function to the permanent object name and selects, based on a result of the function applied to the permanent object name, a server of a plurality of servers. The system also includes an object manager that sends the object to the selected server.

According to another embodiment, a method of storing an object in a distributed storage system includes receiving, by one or more processors, a request to save an object having an initial object name within a file system space. The method also includes determining, based on a set of regular expressions, whether the initial object name is a temporary object name. The method further includes when the initial object name is determined to be a temporary object name, transforming, based on the set of regular expressions, the initial object name into a permanent object name. The method also includes applying a function to the permanent object name. The method further includes selecting, based on a result of the function applied to the permanent object name, a server of a plurality of servers. The method also includes sending the object to the selected server.

According to another embodiment, a non-transitory machine-readable medium includes a plurality of machine-readable instructions that when executed by one or more processors are adapted to cause the one or more processors to perform a method including receiving a request to save an object having an initial object name within a file system space; determining, based on a set of regular expressions, whether the initial object name is a temporary object name; when the initial object name is determined to be a temporary object name, transforming, based on the set of regular expressions, the initial object name into a permanent object name; applying a function to the permanent object name; selecting, based on a result of the function applied to the permanent object name, a server of a plurality of servers; and sending the object to the selected server.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
  A. Temporary Object Name
  B. Transform the Temporary Object Name into a Permanent Object Name
  C. Save the Object at a Server Based on the Permanent Object Name
III. Example Method
IV. Example Computing System

I. OVERVIEW

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

An object may be given a temporary object name and stored on a selected server in a decentralized distributed storage system. In an example, a hash for the object based on the object's temporary name is generated and used to select the server on which to store the object. The temporary object name, however, is temporary and eventually changes to a permanent name. When the object is later retrieved, a hash for the object's permanent name, rather than the object's temporary name, may be generated to select the server to which a request for the object is sent. As such, when the object is later retrieved, a request for the object is sent to the server that was selected based on the object's permanent object name rather than the object's temporary object name.

A first server selected based on hashing the object's temporary name may be different from a second server selected based on hashing the object's permanent name. It may be likely that the second server does not have the object because it was stored on the first server. The distributed storage system includes a plurality of servers that make up a conceptual ring. Accordingly, if the server does not have the requested object, a request for the object may be sent to another server in the decentralized distributed storage system until the object is found. This may happen for each object that is stored in the distributed storage system and may be inefficient.

This disclosure provides a technique to store the object so that it is more likely to be stored initially at the correct location for subsequent retrieval. The application of the hash function to determine where to store the object may be perturbed until the object's permanent object name is determined. The object's permanent object name may be derived from the object's temporary object name. A regular expression may be used to recognize a temporary object name and reverse the effect of an application's own permanent-to-temporary name transformation. This may include deleting, rearranging, and/or replacing parts of the temporary object name, such as a leading "." that is used to hide the object or a trailing random number that is used to ensure uniqueness. After the regular expression change has been applied, the hash function may be performed on the object's permanent object name. Although the hash function is applied to the object's permanent object name, the object may still be created using the temporary object name. A server is selected based on a result of the hash, and the object is sent to the selected server for storage. Thus, the object is stored in a correct and expected location rather than the server that would have been selected had the hash function been applied to the object's temporary object name. Thus, the lookup and relocation inefficiency may be avoided.

For brevity, the disclosure may describe the object as being a file. This is not intended to be limiting, and the object may be any object having an object name within a file system. For example, the object may be a document, directory, device file, link, or socket. Additionally, the disclosure may describe applying a hash function to an object name. This is not intended to be limiting, and other functions may be applied to the object name.

II. EXAMPLE SYSTEM ARCHITECTURE

Figure 1:
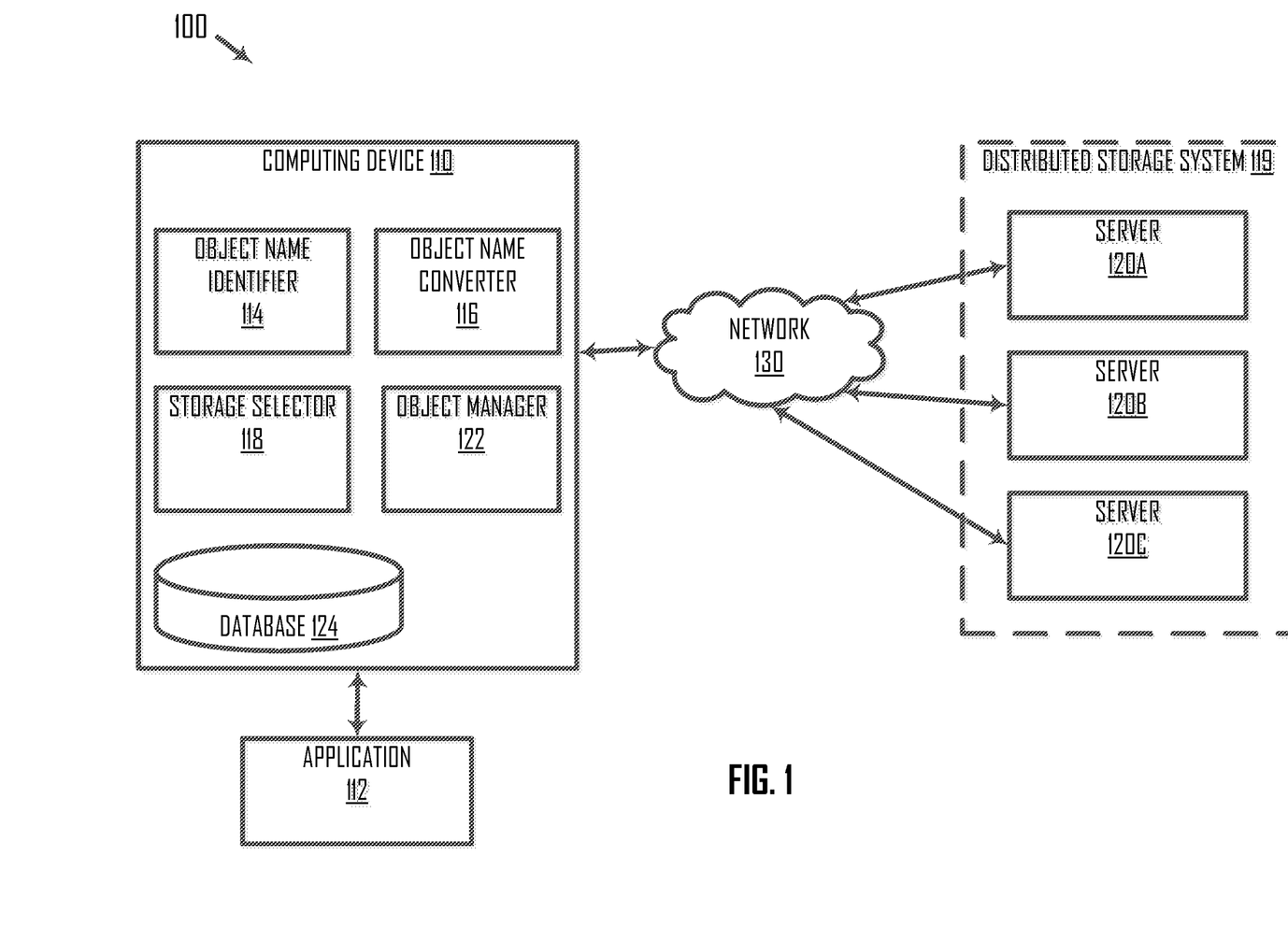
FIG. 1 is a simplified block diagram illustrating a system for storing an object in a distributed storage system, according to an embodiment.

FIG. 1 is a simplified block diagram illustrating a system 100 for storing an object in a distributed storage system, according to an embodiment.

System 100 includes a computing device 110 and a distributed storage system 119. Distributed storage system 119 includes a plurality of servers including servers 120A, 120B, and 120C. An object may be stored at only one of the plurality of servers at a time.

Each of servers 120A, 120B, and 120C may be located at different geographical locations. Computing device 110, server 120A, server 120B, and server 120C are coupled to a network 130. Each of computing device 110, server 120A, server 120B, and server 120C may communicate with each other via network 130. Network 130 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and HTTP, and various combinations of the foregoing.

Computing device 110 may execute an application 112 that creates an object to be stored on a server in distributed storage system 119. In an example, application 112 is a word processor that creates a document for a user and enables the user to enter text in the document. When the user wants to save the document, application 112 may use a pattern to create an initial filename for the document, write the content to the document, and then rename the document to be saved at its final destination. Computing device 110 may then store the file on only one of servers 120A, 120B, and 120C at a time.

A. Temporary Object Name

Computing device 110 includes an object name identifier 114, object name converter 116, storage selector 118, and object manager 122. In an embodiment, object name identifier 114 receives a request to save an object having an initial object name within a file system space. Before the object is saved at its final destination, the object may be written to a temporary location and have a temporary object name. The object may then be moved to its final destination after the object has been renamed to its permanent object name. As such, a temporary copy of the object having the temporary object name and a fully written copy of the object having the permanent object name may exist simultaneously. Accordingly, if the object is not properly saved at its final destination, a temporary copy of the object still exists and may be used again to save the object at the final destination.

A temporary object name may refer to the name of the object that application 112 assigns to the object and is the name of the object when it is saved to the temporary location. A permanent object name may refer to the name of the object that the user requests application 112 to assign to the object. The permanent object name is the name of the object when it is eventually saved to the final location (e.g., a server in distributed server system 119). The permanent object name may be changed by the user at a later point in time.

Object name identifier 114 may determine, based on a set of regular expressions, whether the initial object name is a temporary object name. A regular expression is a sequence of characters that may match another sequence of characters or sets of characters and may identify a pattern. A pattern may include one or more character literals, operators, or constructs and may direct the automation of text processing of a sequence of characters. For example, the regular expression may break apart an object name and identify the permanent part of the object name. Object name identifier 114 may recognize a pattern in the initial filename. For example, the regular expression may take into consideration an application's common practices for generating a temporary object name. A regular expression may be used to identify text for further processing, such as displaying a pattern match or altering the text.

Client device 110 includes a database 124 that includes the set of regular expressions. The set of regular expressions may be configurable by a user. A user may update one or more regular expressions of the set of regular expressions in the database. Thus, the user may update the set of regular expressions by adding a regular expression to database 124, modifying an existing regular expression in database 124, or deleting a regular expression from database 124. This may be advantageous because the user may be aware of applications that generate the temporary object name in a particular way and use this knowledge to identify regular expressions that recognize the temporary object names. Although database 124 is illustrated as being included in client device 110, database 124 may be coupled to client device 110 via a network (e.g., network 130).

In an example, a user sends a request to application 112 to save a file as "XYZ," and application 112 generates an initial filename for the file to be saved. Application 112 may include "." as a prefix and "." followed by a random number as a suffix. As such, application 112 may generate ".XYZ.58732" as the initial filename for "XYZ." Application 112 may add the prefix and suffix to the filename to ensure that the file does not collide with another instance trying to perform the same action with another file. Further, this may also ensure that the file does not exist at the correct location with partial content. Thus, computing device 110 may write the file having the temporary filename to a location that is not visible and then instantaneously move the file to a location at which the file is visible when the content is complete. In the initial filename ".XYZ.58732," object name identifier 114 may identify the first "." and the second "." followed by the random number 58732 and thus determine that the initial filename is a temporary filename.

If the filename does not match any of the regular expressions, object name identifier 114 may determine that the initial object name is not a temporary object name.

B. Transform the Temporary Object Name into a Permanent Object Name

In an embodiment, when the initial object name is determined to be a temporary object name, object name converter 116 transforms, based on the set of regular expressions, the initial object name into a permanent object name. The regular expression may be used to transform the temporary object name into the permanent object name.

Figure 2:
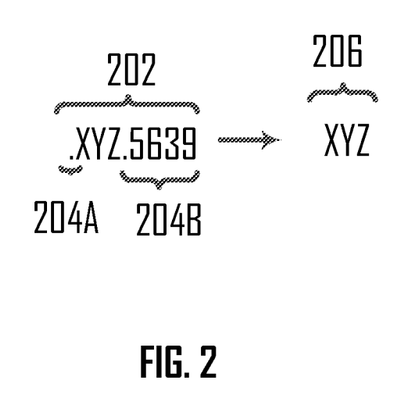
FIG. 2 is a simplified diagram illustrating a temporary object name being transformed into a permanent object name, according to an embodiment.

FIG. 2 is a simplified diagram 200 illustrating a temporary object name being transformed into a permanent object name, according to an embodiment. Diagram 200 includes a temporary object name 202. Transforming the initial object name into the permanent object name may include identifying, based on the set of regular expressions, a pattern indicating temporariness in the initial object name. Object name converter 116 may identify temporary parts 204A and 204B in the object name ".XYZ.58732," such as the first "." and the second "." followed by the random number. Object name converter 116 may identify the pattern ".*.[0-9]" in temporary object name 202. Transforming the initial object name into the permanent object name may include stripping the identified pattern from the initial object name. Accordingly, object name converter 116 may strip temporary parts 204A and 204B to determine the permanent object name "XYZ" 206. Object name converter 116 may perform other actions to determine the permanent object name. The permanent object name rather than the temporary object name may be used to determine where to store the object.

Although object name converter 116 has been described as transforming the temporary object name into the permanent object name by stripping the temporary parts in the temporary object name, other ways to transform the temporary object name into the permanent object name are within the scope of the disclosure. For example, object name converter 116 may substitute a first set of characters in the temporary object name with a second set of characters to determine the permanent object name. For instance, object name converter 116 may substitute each "." in the temporary object name with the set of characters "abc." In another example, object name converter 116 may identify a first set of characters in the temporary object name and include a second set of characters before or after the first set of characters to determine the permanent object name. For instance, for each identified ".", object name converter 116 may add the set of characters "abc" after the ".". These are merely examples, and object name converter 116 may perform a plethora of additions, deletions, and substitutions using, for example, the set of regular expressions to transform the temporary object name into the permanent object name.

C. Save the Object at a Server Based on the Permanent Object Name

In an embodiment, storage selector 118 applies a function to the permanent object name and selects, based on a result of the function applied to the permanent object name, a server of a plurality of servers. Object manager 122 may send the object to the selected server to be stored on the selected server. Storage selector 118 applies the function to the permanent object name rather than the temporary object name. As such, the object is initially stored on the correct server and a subsequent retrieval of the object from the selected server will be a hit.

In an example, the hash space is divided into three equal parts among servers 120A, 120B, and 120C. Server 120A may store files having permanent filenames that are hashed and return a result from 0-333. Server 120B may store files having permanent filenames that are hashed and return a result from 334-667. Server 120C may store files having permanent filenames that are hashed and return a result from 668-1001.

Storage selector 118 may apply a hashing function to the permanent filename as follows:

Hash function (XYZ)=597.

Accordingly, storage selector 118 may select server 120B as being the server to store the file, and object manager 122 may send the file to server 120B. Object manager 122 may send a request to save the object to the selected server (e.g., server 120B). The selected server may receive the request and save the object based on the request. Using the techniques described in the disclosure, it may be unnecessary to modify the servers in distributed storage system 119.

At a later point in time, object manager 122 may receive a request to access the object. Storage selector 118 may apply the function to the permanent object name and select, based on a result of the function applied to the permanent object name, a server of a plurality of servers. In keeping with the above example, storage selector applies the hashing function to the permanent filename "XYZ" and obtains 597 as the result, indicating that server 120B may have the file. Object manager 122 then sends a request for the file to server 120B, the selected server. If the selected server has the file, the selected server sends the file to computing device 110.

If the selected server does not have the file, the filename may have changed. In this case, the servers in distribute storage system 119 may be conceptualized as a ring and object manager 122 may go clockwise (or any other order) around the ring to request the object from the next server.

Applying the hash function to the permanent filename may have advantages over applying the hash function to the temporary filename because selecting the server on which to store the file based on the result of the hash function applied to the temporary filename may result in the file being initially stored at an incorrect location (e.g., servers 120A or 120C) for subsequent retrieval. When the user wants to access the file at a later point in time, storage selector applies the hashing function to the permanent filename "XYZ" and obtains 597 as the result, indicating that server 120B may have the file. Server 120A or 120C, however, may have the file. Object manager 122 may then send a request for the object to server 120B, resulting in a miss. Object manager 122 may then go around the conceptual ring of servers and continue to ask the next server for the file until it is found and retrieved. This disclosure may provide techniques to avoid this inefficiency because it stores the file initially at the correct server.

A server may be added to or removed from the distributed storage system. If another server is added to distributed storage system 119, the hash space divided among servers 120A, 120B, and 120C may be redistributed so that the additional server is also included in the hash space distribution. For example, server 120A may store files having permanent filenames that are hashed and return a result from 0-249. Server 120B may store files having permanent filenames that are hashed and return a result from 250-500. Server 120C may store files having permanent filenames that are hashed and return a result from 501-750. The additional server may store files having permanent filenames that are hashed and return a result from 751-1001.

Similarly, if a server is removed from distributed storage system 119, the hash space divided among servers 120A, 120B, and 120C may be redistributed so that the removed server is no longer included in the hash space distribution. For example, server 120A may store files having permanent filenames that are hashed and return a result from 0-500. Server 120B may store files having permanent filenames that are hashed and return a result from 501-1001.

In an embodiment, to identify which hash results correspond to which servers, computing device 110 may only know the plurality of servers in distributed storage system 119 and which hash results correspond to which servers in distributed storage system 119. This may provide an advantage of storing and maintaining a reduced amount of data compared to storing a mapping of object names to particular servers (e.g., a directory that includes a one-to-one mapping of object names to locations).

In another embodiment, computing device 110 includes a cache including one or more mappings from a permanent object name to a selected server. Object manager 122 may store in the cache a mapping from the permanent object name to the selected server and search the cache to identify the mapping. In this way, it may be unnecessary for computing device 110 to apply the function to the permanent object name each time an object is requested.

As discussed above and further emphasized here, FIG. 1 is merely an example, which should not unduly limit the scope of the claims. Although system 100 is described herein with reference to computing device 110 applying the function to the permanent object name, other embodiments may include a computing device different from computing device 110 applying the function to the permanent object name. The entity that sends the object to one of the plurality of servers may apply the function to the permanent object name and select a server based on a result of the function.

Figure 3:
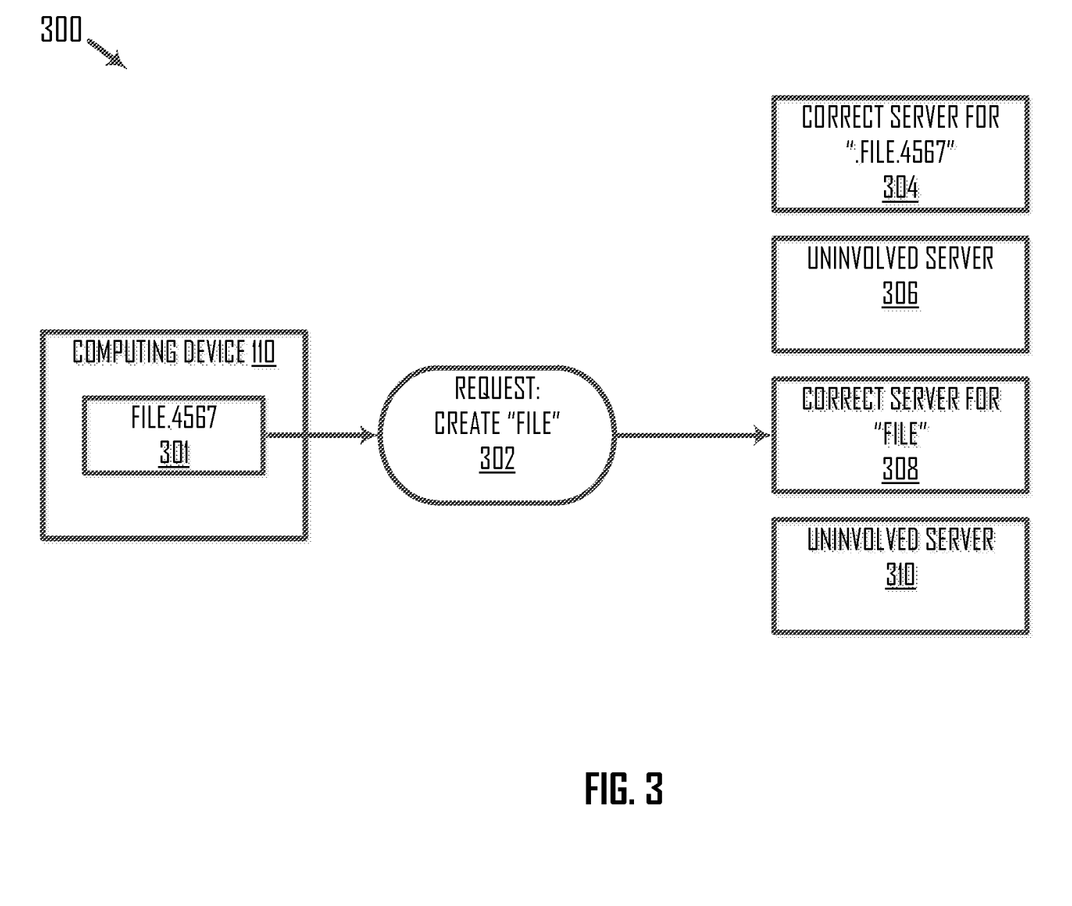
FIG. 3 is a simplified block diagram illustrating a request being sent to the correct server based on the modified name, according to an embodiment.

For example, in an embodiment, the entity that sends the object to the selected server is a proxy that communicates with computing device 110. System 300 may include a gateway (not shown) that joins dissimilar networks and handles data transfer and the conversion of messages from a protocol of the sending network to a protocol used by the received network. The servers in distributed storage system 119 may communicate in one or more protocols that are not native to computing device 110. In this case, computing device 110 may communicate with distributed storage system 119 via proxy server 310, and proxy server 310 may select the server in distributed storage system 119 on which to store the object and send the object to the selected server for storage.

FIG. 3 is a simplified block diagram 300 illustrating a request being sent to a correct server based on the modified name, according to an embodiment.

In diagram 300, an object having an initial filename ".file.4567" 301 may be created and a server may be selected among servers 304, 306, 308, and 310 to store the file. Server 304 is the correct server to select for ".file.4567", server 306 is an uninvolved server, server 308 is the correct server to select for "file", and server 310 is an uninvolved server. The initial filename may be generated by an application (e.g., application 112). Further, servers 304, 306, 308, and 310 may be included in distributed storage server 119.

If computing device 110 were to select, based on the initial filename ".file.4567", a server to store the file, server 304 may be selected. In diagram 300, server 304 is the correct server for a file having the filename ".file.4567" to be stored and the incorrect server for a file having the filename "file" to be stored. The filename ".file.4567", however, is saved as its permanent filename "file". When the file is later retrieved, the permanent filename "file" is used to select server 308 to which to send the request for the file. Accordingly, the request for the file may be sent to server 308, which does not have the file because it was stored at server 304.

To improve efficiency, client device 110 may use the techniques in the present disclosure to determine, based on a set of regular expressions, that ".file.4567" is a temporary filename and transform, based on the set of regular expressions, the temporary filename ".file.4567" into the permanent filename "file". Computing device 110 may then use "file" (rather than ".file.4567") to select the server to which to send a request to save the file. Accordingly, computing device 110 selects server 308 and sends a request 302 to server 308 to create the file. An initial request for the file at a later point in time may be directed to the correct server that has the file (server 308).

Figure 4:
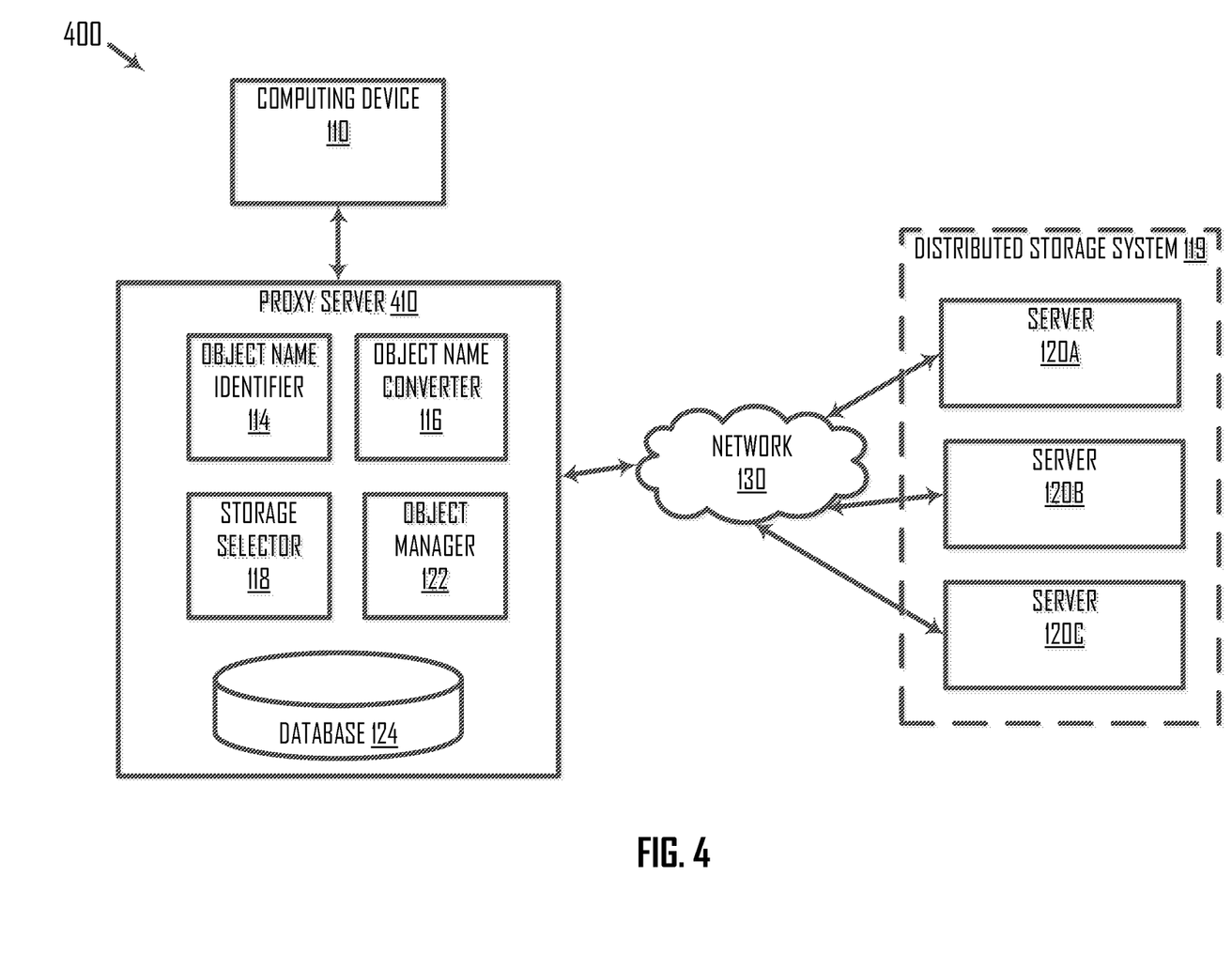
FIG. 4 is a simplified block diagram illustrating a system for storing an object in a distributed storage system, according to an embodiment.

FIG. 4 is a simplified block diagram illustrating a system 400 for storing an object in a distributed storage system, according to an embodiment. System 400 includes computing device 110 and distributed storage system 119. System 400 also includes a proxy server 410 that applies the function to the permanent object name and selects, based on a result of applying the function, a server in distributed storage system 119 to store the object. Proxy server 410 includes object name identifier 114, object name converter 116, storage selector 118, object manager 122, and database 124. Computing device 110 may send the object and the initial object name to proxy server 410 for processing and to select on which server in distributed storage system 119 to store the object.

It should also be understood that the modules or components in FIGS. 1, 3 and 4 may reside in a different machine from that indicated in the figures. For example, computing device 110 may include object name identifier 114 and object name converter 116 for converting a temporary object name to a permanent object name, and proxy server 410 may include storage selector 118 and object manager 122 to store the object on the appropriate server in distributed storage system 119. In this example, computing device 110 sends proxy server 410 the permanent object name and proxy server 410 then proceeds to select a server on which to store the object by applying, for example, a hashing function to the permanent object name.

Further, although system 100 is described herein with reference to three servers in distributed storage system 119, other embodiments including more than three servers that may store objects from computing device 110 are within the scope of this disclosure. Additionally, although system 100 is described herein with one application executing on client device 110, other embodiments including more than one application executing on client device 110 are within the scope of this disclosure.

Moreover, it should be understood that one or more modules or components (e.g., object name identifier 114, object name converter 116, storage selector 118, and object manager 122) in FIG. 1 may be combined with another module or component. In an example, object name identifier 114 and object name converter 116 are combined into one module or component. It should also be understood that one or more modules or components in FIG. 1 may be separated into more than one module or component. In an example, storage selector 118 is split into a first storage selector and a second storage selector.

IV. EXAMPLE METHODS

Figure 5:
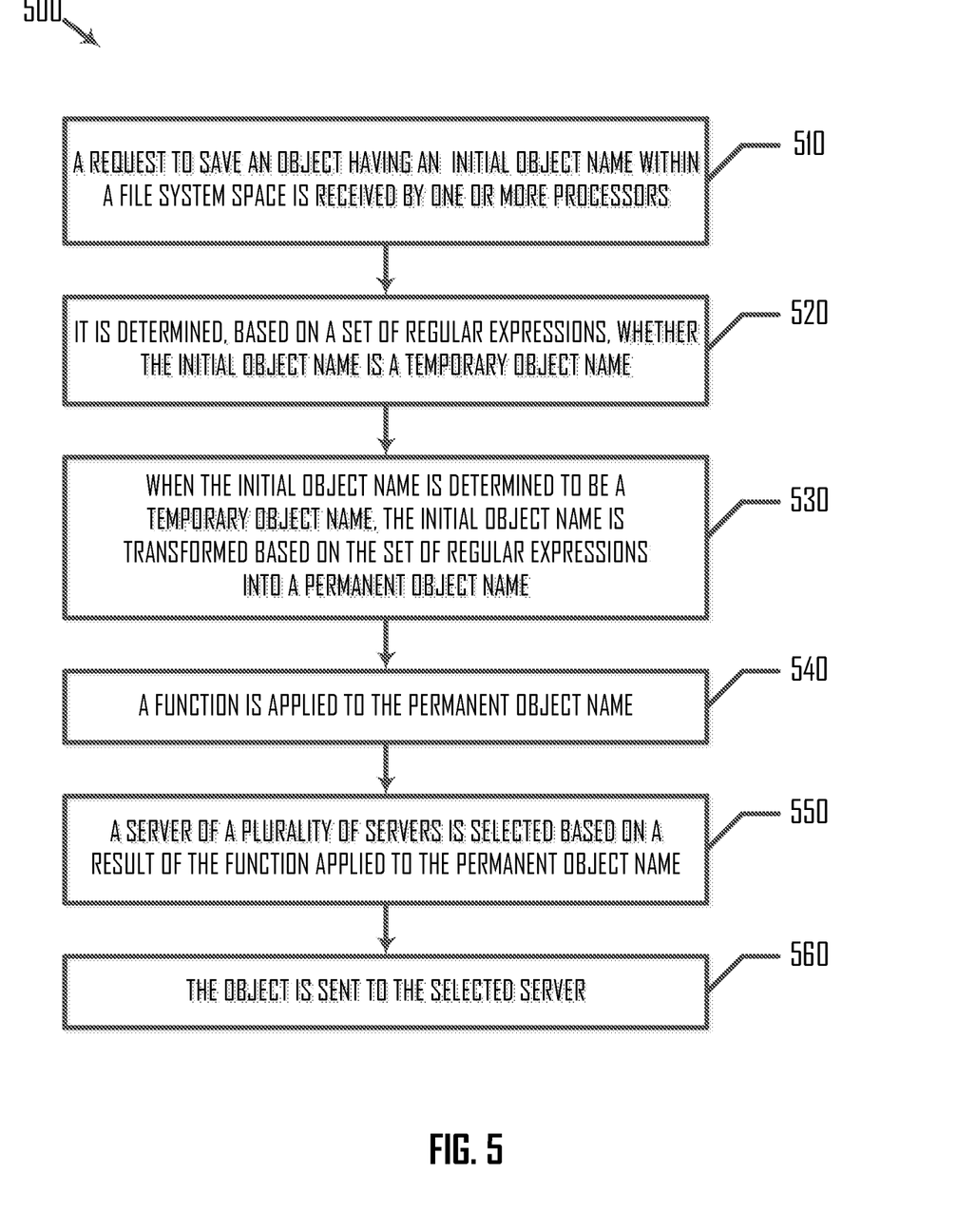
FIG. 5 is a simplified flowchart illustrating a method of storing an object in a distributed storage system, according to an embodiment.

FIG. 5 is a simplified flowchart illustrating a method 500 of storing an object in a distributed storage system, according to an embodiment. Method 500 is not meant to be limiting and may be used in other applications.

Method 500 includes steps 510-560. In a step 510, a request to save an object having an initial object name within a file system space is received by one or more processors. In an example, object name identifier 114 receives, by one or more processors, a request to save an object having an initial object name within a file system space. In a step 520, it is determined, based on a set of regular expressions, whether the initial object name is a temporary object name. In an example, object name identifier 114 determines, based on a set of regular expressions, whether the initial object name is a temporary object name.

In a step 530, when the initial object name is determined to be a temporary object name, the initial object name is transformed, based on the set of regular expressions, into a permanent object name. In an example, when the initial object name is determined to be a temporary object name, object name converter 116 transforms, based on the set of regular expressions, the initial object name into a permanent object name. In a step 540, a function is applied to the permanent object name. In an example, storage selector 118 applies a function to the permanent object name. In a step 550, a server of a plurality of servers is selected based on a result of the function applied to the permanent object name. In an example, storage selector 118 selects, based on a result of the function applied to the permanent object name, a server of a plurality of servers. In a step 560, the object is sent to the selected server. In an example, object manager 122 sends the object to the selected server.

It is also understood that additional method steps may be performed before, during, or after steps 510-560 discussed above. It is also understood that one or more of the steps of method 500 described herein may be omitted, combined, or performed in a different sequence as desired.

IV. EXAMPLE COMPUTING SYSTEM

Figure 6:
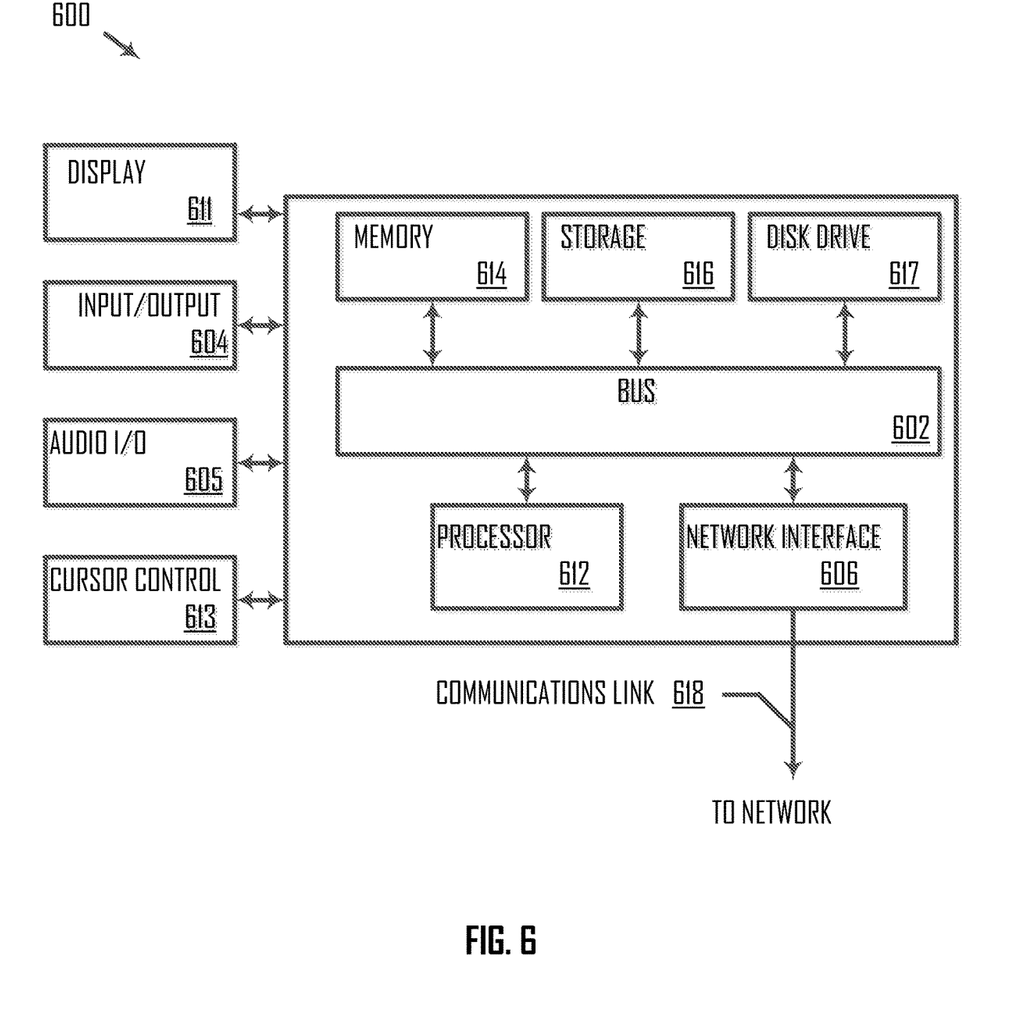
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, computing device 110 may include a client or a server computing device. Computing device 110 may include one or more processors, and may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a microcontroller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for storing an object in a distributed storage system, the system comprising:

an object name identifier that receives a request from an application to save an object having an initial object name within a file system space and determines, based on a set of regular expressions, whether the initial object name is a temporary object name, wherein the set of regular expressions includes at least one character construct, the object is created by the application, and a name of the object is the initial object name;

an object name converter that, when the initial object name is determined to be a temporary object name: (i) transforms, based on the set of regular expressions, the initial object name into a permanent object name, and (ii) renames the object as the permanent object name, wherein the temporary object name is different from the permanent object name, the permanent object name is derived from the temporary object name, and at least part of the initial and permanent object names are based on a permanent-to-temporary name transformation pattern used by the application;

a storage selector that applies a function to the permanent object name and selects, based on a result of the function applied to the permanent object name, a server of a plurality of servers, wherein the object name converter transforms the initial object name into the permanent object name before the object is stored at the selected server; and an object manager that sends the object to the selected server.

2. The system of claim 1, wherein the object manager sends a request to save the object to the selected server, and the request causes the selected server to save the object using the permanent object name.

3. The system of claim 2, wherein the object manager receives a request to access the object and sends a request for the object to the selected server.

4. The system of claim 3, wherein the storage selector reapplies the function to the permanent object name, and the object manager selects, based on a result of reapplying the function to the permanent object name, the selected server.

5. The system of claim 1, wherein the object is stored at the selected server, wherein the temporary object name is the name of the object when the object is saved to a temporary location in the file system space, and wherein the permanent object name includes a name requested by a user for a name of the object and includes the requested name when the object is stored at the selected server.

6. The system of claim 1, wherein when the initial object name is determined to be a temporary object name, the object name converter identifies, based on the set of regular expressions, a pattern indicating that the initial object name is a temporary object name and strips the identified pattern from the initial object name to determine the permanent object name, and wherein the pattern includes the at least one character construct.

7. The system of claim 6, wherein the pattern includes a period and a random number.

8. The system of claim 6, wherein the pattern includes a suffix in the temporary object name, and the object name converter strips the suffix from the temporary object name to determine the permanent object name.

9. The system of claim 6, wherein a subset of the temporary object name and a subset of the permanent object name are the same.

10. The system of claim 1, wherein the object manager writes the object having the temporary object name to a first location that is not visible to a user, and wherein the object manager sends the object to a second location that is visible to the user, and the second location is located on the selected server.

11. The system of claim 1, wherein the object having the temporary object name and a fully written copy of the object having the permanent object name exist simultaneously within the file system space.

12. The system of claim 1, wherein the function is a hash function, and wherein if the object name converter determines that the initial object name is not a temporary object name, the initial object name is a permanent object name.

13. The system of claim 1, wherein the object name identifier determines, based on the initial object name and the set of regular expressions, the temporary object name, and wherein the application receives the initial object name from a user.

14. The system of claim 1, wherein the application runs on a computing device that saves the object using the initial object name into a temporary location, and after the object manager sends the object to the selected server, the object is inaccessible via the temporary location.

15. The system of claim 1, wherein the object name identifier determines that the initial object name is not a temporary object name if the initial object name does not match at least one regular expression of the set of regular expressions, and wherein the object name identifier determines that the initial object name is a temporary object name if the initial object name matches at least one regular expression of the set of regular expressions.

16. A method of storing an object in a distributed storage system, the method comprising:
   receiving, by one or more processors, a request from an application to save an object having an initial object name within a file system space, wherein the object is created by the application, and a name of the object is the initial object name;
   determining, based on a set of regular expressions, that the initial object name is a temporary object name, the set of regular expressions including at least one character construct;
   in response to a determination that the initial object name is a temporary object name:
      transforming, based on the set of regular expressions, the initial object name into a permanent object name, wherein the temporary object name is different from the permanent object name, the permanent object name is derived from the temporary object name, and at least part of the initial and permanent object names are based on a permanent-to-temporary name transformation pattern used by the application; and
      renaming the object as the permanent object name;
   applying a function to the permanent object name;
   selecting, based on a result of the function applied to the permanent object name, a server of a plurality of servers; and
   sending the object to the selected server.

17. The method of claim 16, wherein the sending includes sending a request to save the object to the selected server, and the request causes the selected server to save the object using the permanent object name.

18. The method of claim 17, further comprising:
   receiving a request to access the object having the permanent object name;
   reapplying the function to the permanent object name;
   selecting, based on a result of reapplying the function to the permanent object name, a second server of the plurality of servers;
   sending a request for the object to the second selected server; and
   receiving the object from the second selected server.

19. The method of claim 16, wherein the object is stored at the selected server, wherein the temporary object name is the name of the object when the object is saved to a temporary location in the file system space, and wherein the permanent object name includes a name requested by a user for a name of the object and includes the requested name when the object is stored at the selected server.

20. A non-transitory machine-readable medium comprising a plurality of machine-readable instructions that when executed by one or more processors is adapted to cause the one or more processors to perform a method comprising:
   receiving a request from an application to save an object having an initial object name within a file system space, wherein the object is created by the application, and a name of the object is the initial object name;
   determining, based on a set of regular expressions, that the initial object name is a temporary object name, the set of regular expressions including at least one character construct;
   in response to a determination that the initial object name is a temporary object name:
      transforming, based on the set of regular expressions, the initial object name into a permanent object name, wherein the temporary object name is different from the permanent object name, the permanent object name is derived from the temporary object name, and at least part of the initial and permanent object names are based on a permanent-to-temporary name transformation pattern used by the application; and
      renaming the object as the permanent object name;
   applying a function to the permanent object name;
   selecting, based on a result of the function applied to the permanent object name, a server of a plurality of servers; and
   sending the object to the selected server.

* * * * *